United States Patent
Nibe et al.

(10) Patent No.: US 10,504,376 B2
(45) Date of Patent: Dec. 10, 2019

(54) SYSTEM AND METHOD FOR IMPROVING THE QUALITY OF COMPUTER GENERATED EXAMS

(75) Inventors: Kjell Bjornar Nibe, Hamar (NO); Eirik Mikkelsen, Furnes (NO)

(73) Assignee: RELIANT EXAMS AS, Hamar (NO)

( * ) Notice: Subject to any disclaimer, the term of this patent is extended or adjusted under 35 U.S.C. 154(b) by 722 days.

(21) Appl. No.: 12/429,818

(22) Filed: Apr. 24, 2009

(65) Prior Publication Data
US 2010/0203492 A1 Aug. 12, 2010

Related U.S. Application Data

(63) Continuation of application No. PCT/NO2007/000366, filed on Oct. 24, 2007.

(30) Foreign Application Priority Data

Oct. 25, 2006 (NO) .................................. 2006 4831

(51) Int. Cl.
*G09B 7/00* (2006.01)
(52) U.S. Cl.
CPC ..................... *G09B 7/00* (2013.01)
(58) Field of Classification Search
CPC ....................................................... G09B 7/00
USPC ................................ 434/323, 322
See application file for complete search history.

(56) References Cited

U.S. PATENT DOCUMENTS

| | | | |
|---|---|---|---|
| 6,431,875 B1* | 8/2002 | Elliott et al. | 434/322 |
| 2003/0163527 A1 | 8/2003 | Hsu | |
| 2003/0228563 A1 | 12/2003 | Sang et al. | |
| 2004/0189441 A1* | 9/2004 | Stergiou | 340/5.51 |
| 2005/0192954 A1* | 9/2005 | Gupta et al. | 707/4 |
| 2006/0121432 A1 | 6/2006 | Sun | |

OTHER PUBLICATIONS http://en.wikipedia.org/w/index.php?title=Kuder-Richardson_Formula_20&oldid=23483089 Sep. 2005.*
http://en.wikipedia.org/w/index.php?title=Spearman%E2%80%93Brown_prediction_formula&oldid=16262535 Mar. 2005.*

* cited by examiner

*Primary Examiner* — Robert P Bullington
(74) *Attorney, Agent, or Firm* — Dorsey & Whitney LLP

(57) ABSTRACT

System and method for generating exams, questionnaires or similar, including a set of questions to be answered, the system comprising a data base including a number of questions in at least one topic, each question being associated with a data set related to answers given to the questions in previous uses of the question sets, the system further comprising selection means for randomly selecting a question within one or more predetermined topics from said data base, and an evaluation means for evaluating the selected questions relative to predetermined requirements to the selected questions and their corresponding answers in said data set, and discarding questions not fulfilling said requirements.

20 Claims, 1 Drawing Sheet

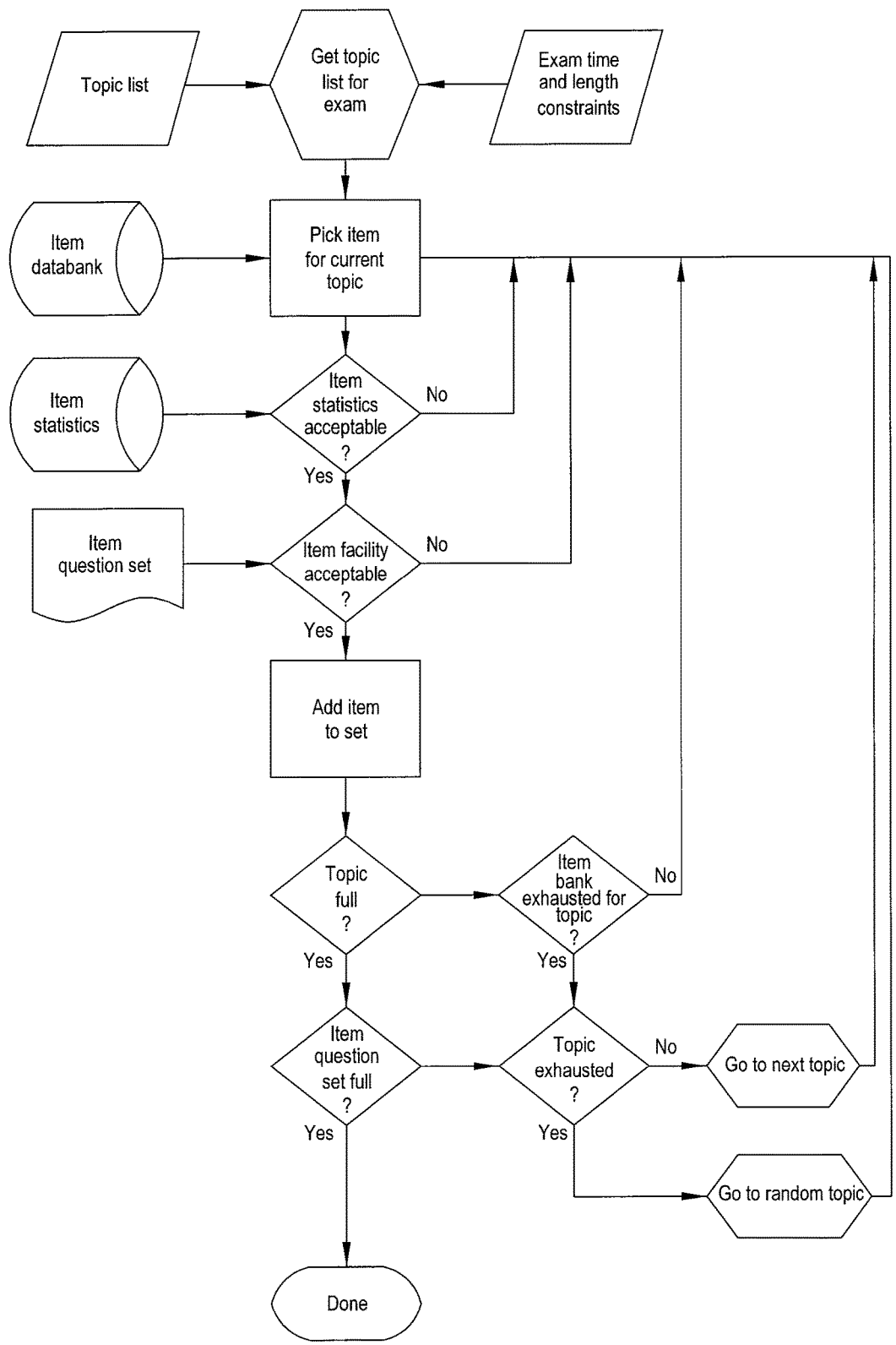

SYSTEM AND METHOD FOR IMPROVING THE QUALITY OF COMPUTER GENERATED EXAMS

The present invention relates to a method and system for improving the quality of computer generated exams by utilizing empirical data about the quality of each item in a question bank. More specifically it relates to the use of empirical data about the quality of each item the question set is comprised of.

Some types of exams and questionnaires, like tests for drivers licenses etc are produced in fairly large quantities and in different occasions. To reduce the risk of cheating and copying of older answers the exams need to be different, and so each exam has to be constructed so as to be unique.

Current methods for constructing exam question sets based on questions in a item data bank are limited to either manual selection of questions by a qualified professional, or a random selection of questions from a qualified data bank. A known system used for pilot exams includes approximately 7000 approved questions, but practice has shown that even this data bank contains a large quantity of unsuitable or erroneous questions and answers. The total number of questions is so large that it is subject to an inherent problem as it does not take the quality of the exam into consideration and thus requires manual quality control and verification by a by a qualified professional. Thus much of the advantage gained by the automatic selection is lost.

Quality assurance of a data bank containing questions is very resource-demanding. Several systems using such data banks for generating tests are known and the quality of those tests are limited by the quality of the content in the question data bank. These systems are dependent on that those working with the content in the data base are doing a very thorough job. The amount of data to be analyzed to be able to perform such a job, especially regarding low level data from multiple choice tests, are far too large to be performed manually or in spreadsheet models. For instance, a tests with a small amount of candidates (6000) will need a spreadsheet with 8.4 million cells.

Because of this there is a need for improving the quality of computer generated exams to lessen the burden and costs of verifying the quality of an exam question set.

It will be an advantage in the exam system industry to have a system being able to automatically avoid re-use of questions, which statistically does not divide between strong and weak candidates.

The object of this invention is therefore to improve the quality of automatically generated exams or similar. This object is obtained as disclosed in the accompanying claims.

The present invention thus provides means for predicting the quality of computer generated exams with question items drawn from a structured item data bank, provided that a certain amount of items have been used in similar question sets in the past and that the data from earlier use is available to the system. The system is also capable of controlling the order of the questions in the exams along predetermined guidelines, such as putting the simple questions in front and the difficult but differentiating questions later in the exam.

The system and method draws question items from a structured item data bank using empirical data from previous exams to optimize the set of items which makes up a computer generated exam.

Further, the method provides feedback to the question authors about the quality of the provided questions to differentiate between exam candidates of different strengths.

Further, the method provides feedback to the educating institution about the effectiveness of their syllabus coverage and the overall quality of the education in the case where education and examination is provided by different organizational bodies.

The invention will be described more in detail with reference to the accompanying drawing, illustrating the invention by way of example.

FIG. 1 illustrates schematically the method according to the invention.

DESCRIPTION OF THE INVENTION

Broadly speaking, the invention relates to a computerized examination system that generates exam question sets from question items stored in a data bank.

The invention improves upon such a basic system by discriminatingly picking items which—based on empirical data—is better suited to the task of separating candidates of different skill levels. The invention thus reduces the cost and time needed for exam question set authors to produce suitable question sets.

When used in a tightly managed automatic—or possibly manual—exam process, in which results from actual examinations is made available to the invention through a feedback mechanism, the invention uses commonly known good statistical methods to analyze the performance of the individual question items in the exam question set. The performance metrics are then stored in a data bank with reference to the items in the item data bank.

The data bank mentioned may be one or more related data storage devices such as hard disks, including the questions and the related information about the quality of the answers, question providers, the exams in which each answer was part, as well as other information, and may be contained in one computer or in a computer network.

When the invention is used to generate a new exam question set it may be directed to improve the quality of the generated set by picking a certain amount of well-known good items based on the statistical measures of the individual items ability to select between candidates, and by picking items from a sound range of facilities such that the generated question set effectively discriminates candidates within the range of passable skill levels. In addition to the well known questions from the data set, a certain amount of questions should in most cases be chosen among the unused questions to ensure wide coverage of the item data bank, including any newly added items.

With reference to FIG. 1 the preferred embodiment of the invention relates to a method were a topic list is first chosen form an available line of topics, and the exam time and other constraints are set.

The first step is then to select a question within one of one or more topics as an item in an item data bank. Each item is related to a corresponding databank comprising a list of known statistical data for each item. These statistical data may include several variables, such as the correlation between the quality of the answers given to the question and the quality of the rest of the exam given by that person, so that the quality of the question is related to whether the generally good candidates answer correctly to the question or the answers are arbitrary, which may indicate that they are easy to misunderstand. It may also include data related to the deviation in the responses given to the question, e.g. if it is able to distinguish between the candidates or if every candidate got approximately the same score on the questions. Item picked from the database that does not fit into the intended profile of the exam are then rejected and a new item is picked. Other criteria may of course also be chosen depending on the nature of the exam or questionnaire.

In the illustrated example, the facility of the question is also taken into consideration, by looking at the general score given in relation to the question so that the difficulty of the question is considered. This way one can obtain a predetermined distribution of the difficulty of the questions in the exam, e.g. so that the exam contain some, maybe initial, questions which most of the candidates should be able to answer, while other questions are meant to be answered by only the best students.

The procedure illustrated in FIG. 1 thus compares the data related to the selected items and reject them from the question set if they do not fit into the chosen profile regarding the selectivity and facility of the test, and goes back to choose a new item from the data base. The different topics and questions may be position by the system in predetermined order, such as sorted regarding facility or the differentiating capability of the questions.

If the question is acceptable the new item is added to the list and the procedure is repeated until the required number of questions in the relevant topic is full. If other topics are required the procedure is repeated for other topics until the exam has the wanted profile regarding item specifications, topics and difficulties.

When a computer based system for automatic exam item set generation constructs a question item set based on questions from a question item data bank, a fixed or random amount of questions can be chosen among question items which have been used in previous similar question item sets. When data indicating the facility, selectivity and distribution of answers among the various choices is available, the system may construct a set of probable item set answers. With such a set of probable item set answers the system may calculate a measure for the overall test-quality of the set of question items—such as Kuder-Richardsons measure (KR 20) or Cronbachs Alpha measure. By using the Spearman-Brown prediction formula a measure of the quality of the extended set with items of known and unknown quality can be obtained. This predicted measure of the quality helps the operator responsible for the overall quality assurance of the question item set to reduce the amount of time needed for the quality assurance process.

Constructing a set of probable question set answers will preferably be done by first finding the average distribution of scores for the subject. An array of empty answers for n candidates is then constructed, where n is the number of items with data available, or a multiple of this if the number of items is less than 10. For each item i the system then multiplies the selectivity $s_i$ with the number of candidates n and distributes the product of the relative amount of correct answers, $p_A$ and the number of answers n such that the correct answers forms a normal distribution with location at the candidate nearest $s_i n$. Wrong answers are distributed among the remaining candidates. When answers to all items have been assigned to the constructed answer set, a statistical method for measuring the reliability of a item set can be applied. The resulting item set reliability $\rho_{xx'}$ is then used in the Spearman-Brown prediction formula $$\rho_{xx'}^p = \frac{N\rho_{xx'}}{1 + (N-1)\rho_{xx'}}$$

Here, N is a multiple of the number of items in the known good subset set of items, found by $$N = \frac{N_T}{N_R}$$

(where $N_T$ is the number of items in the complete set, while $N_R$ is the number of items in the constructed subset). The algorithms used for this purpose may vary and may be chosen by a person skilled in the art depending on availability or the current situation.

When introducing new questions into the data bank they need to match the system, and thus need some preliminary quality indications. The Spearman-Brown prediction formula bases these indications on a set having a known reliability (rho) and tells something about what happens to the rho if you increase the set with a known multiplier N, where the new questions (for N>1) is assumed to have the same distribution as of characteristics as the questions in the known set.

When a test has been through a round of exams the system is provided with the actual responses, e.g. through an optical reader, and thus has the quality data for use when the new sets are to be generated. As there will always be a number of "bad" questions in the data base the quality of the new questions will probably be a little less good than the known set. By calculating the actual reliability after the set has been in use and comparing this with the calculated reliability we may also find a coefficient α (where 0<α<1) indicating the overall quality of the questions in the data base. This coefficient may be multiplied with the calculated reliability. Thus the assumed quality of new questions may be corrected relative to the reliability of the whole set after use.

As an example the data base information may also contain information about those who have contributed with questions, and it will be possible to find a number for the overall quality of the questions from this person or workgroup, and thus estimate the coefficient based on their origin.

To summarize, the invention relates to a method and system for improving the quality of computer generated exams with question items drawn from a structured item data bank by using empirical data from previous exams to optimize the set of questions which makes up the computer generated exam. The empirical data for each item on a computer generated exam is collected at the end of an exam session and subject to statistical analysis to find the selectivity, reliability and facility of the item, the item data bank is then updated to reflect the collected empirical data. The computer system and method for drawing questions use the empirical data to discriminate questions, and thus produce an exam question set with a much higher quality than a randomly selected set.

The system and method may also be used for predicting the quality of computer generated exams with question items drawn from a structured item data bank, provided that a certain quantity of items have been used in similar question sets in the past and that the data from earlier use is available to the system. The method constructs a significant distribution of statistically plausible question set answers for the set of items which have data available, and use the Spearman-Brown prediction formula for the set of unused items to predict the overall quality of the question item set.

Although the invention has primarily been described here with relation to exams of different types some other applications may be contemplated, such as questionnaires where the quality or relevance of the answers may affect the value of the responses.

The system performing the method according to the invention comprises a data base including a number of questions in at least one topic, each question being associated with a data set related to answers given to the questions in previous uses of the question sets. The system also includes selection means for randomly selecting a question within one or more predetermined topics from said data base, and an evaluation means for evaluating the selected questions relative to predetermined requirements to the selected questions and their corresponding answers in said data set, and discarding questions not fulfilling said requirements. It also comprises means for feeding the quality information into the database after an exam has been held. All of these may be programmed into a computer or a computer network using general programming tools.

As stated above, the evaluation means in the system is capable of evaluate and reject questions not fulfilling the predetermined requirements, said requirements being related to at least one of the following:

correlation between the quality of the responses given to the questions and the general quality of the response to all the questions in which the answer is provided, so as to ensure that the questions distinguish the generally good candidates, deviation in the quality being above a predetermined value, so as to ensure that the question is suitable for distinguishing between the candidates, the number of correct answers per failure in the question fits with a predetermined distribution, so as to ensure a controlled distribution of the difficulty of the questions in the exam to be generated.

The quality reading of each answer will depend on the exam. Simple true/false exams or other types including choosing the selection from a list may be performed automatically, e.g. with optical readers, while in other written forms may be read with ocr or the grades are introduced manually through a keyboard or mouse.

The invention claimed is:

1. A computer-based system for improving computer generated exams and generating exam question sets suited to separating test candidates of different skill levels, the system comprising:

a database including a number of questions in at least one predetermined topic, each question being associated with a data set comprising prior use information related to answers given to the question in previous uses of such question in question sets presented to test candidates;

said database is stored on at least one data storage device and is updated to reflect empirical data collected from previous exams to find selectivity, facility and reliability of questions and question sets presented to test candidates, wherein the empirical data for each question on the computer generated exams is collected to find the selectivity, reliability and facility of the questions and the database is updated to reflect the collected empirical data, said database further comprising unused questions including newly added questions;

the system further comprising selection means executing on a computer for randomly selecting questions within one or more of the predetermined topics from said database; and an evaluation means executing on a computer for evaluating for possible inclusion in a new question set for presentation to test candidates the selected questions relative to predetermined requirements applied to such prior use information on the selected questions and their corresponding answers in said data set, and discarding from possible inclusion in the new question set selected questions not fulfilling said predetermined requirements, thereby to generate from the database of questions the new question set for presentation to test candidates, wherein selected questions that do not fit a chosen profile regarding selectivity and facility are discarded from the new question set, such that a controlled distribution of difficulty is obtained for the new question set;

wherein the evaluation means is adapted for discarding from the new question set the selected questions not fulfilling the predetermined requirements by fitting a number of correct answers per failure in the selected questions with a predetermined distribution, so as to ensure the controlled distribution of difficulty in the new question set; and wherein the evaluation means is further adapted for:

finding a coefficient indicating a quality of questions in the database, the database including the questions associated with prior use information and the unused questions including newly added questions, by calculating an actual reliability of the new question set after the new question set has been in use and comparing the actual reliability of the new question set after it has been in use to a calculated predicted reliability to find the coefficient, based on:

constructing a set of probable question set answers, and, with the set of probable question set answers, calculating a measure for predicted reliability of the new question set, assuming the new question set to have a same distribution of characteristics as a known set of the questions having known reliability, and correcting the predicted reliability of the new question set, relative to the actual reliability of the new question set after the new question set has been in use, wherein the empirical data are used to discriminate the questions and produce an exam question set with higher quality than a randomly selected set.

2. The system according to claim 1, wherein the data set comprises information regarding quality of the corresponding answers to each question, and wherein the quality of the corresponding answers is related to whether generally good candidates of the test candidates providing an answer answered the question correctly.

3. The system according to claim 2, wherein the information regarding quality of the corresponding answers comprises a deviation in said quality relative to a complete exam question set of which each answer was a part.

4. The system according to claim 1, wherein the prior use information comprises a ratio of correct answers to each question.

5. The system according to claim 1, wherein the evaluation means is further adapted to discard selected questions not fulfilling the predetermined requirements, said predetermined requirements comprising:

a correlation between quality of the answers given to the questions and the quality of an exam question set in which the answer is provided, a deviation in the quality of the answers given to the questions being above a predetermined value to ensure that the selected questions are suitable for distinguishing between test candidates of different skill levels.

6. The system according to claim 1, wherein the system is arranged to use a Kuder-Richardson measure (KR 20) or a Cronbach's Alpha measure to measure overall test-quality of an exam question set comprising previously used questions in the database.

7. The system according to claim 1, wherein the system is arranged to use a Spearman-Brown prediction formula to measure predicted reliability of the new question set according to:

$$\rho_{xx'}^p = \frac{N\rho_{xx'}}{1 + (N-1)\rho_{xx'}}$$

where N is a multiple of the number of items in a known good subset of the new questions set, found by $$N = \frac{N_T}{N_R}$$

(where $N_T$ is the number of items in the new question set, while $N_R$ is the number of items in the subset), and $\rho_{xx'}$ is reliability of the subset.

8. A computer-based method for improving computer-generated exams and generating exam question sets suited to separating test candidates of different skill levels, the method comprising the steps of:

storing a number of questions in at least one predetermined topic in a database, each question being associated with a data set comprising prior use information related to answers given to the question in previous tests presented to test candidates, said database being stored on at least one data storage device and updated to reflect empirical data collected from previous exams to find selectivity, facility and reliability of question and question sets presented to test candidates, wherein the empirical data for each question on the computer generated exams is collected to find the selectivity, reliability and facility of the questions and the database is updated to reflect the collected empirical data, said database further comprising unused questions including newly added questions;

randomly selecting by means executing on a computer questions within one or more of the predetermined topics from said database;

evaluating by means executing on a computer, for possible inclusion in a new question set for presentation to test candidates, the selected questions relative to predetermined requirements applied to such prior use information on the selected questions and their corresponding answer alternatives in said data set; and discarding from possible inclusion in the new question set selected questions not fulfilling said predetermined requirements, thereby generating from the database of questions the new question set for presentation to test candidates, wherein selected questions that do not fit a chosen profile regarding selectivity and facility are discarded from the new question set, such that a controlled distribution of difficulty is obtained;

wherein the evaluating means is adapted for discarding the selected questions not fulfilling the predetermined requirements by fitting a number of correct answers per failure in the selected questions with a predetermined distribution, so as to ensure the controlled distribution of difficulty in the new question set; and wherein the evaluating means is further adapted to find a coefficient indicating a quality of the questions in the database, the database including the questions associated with prior use information and the unused questions including newly added questions, by calculating an actual reliability of the new question set after the new question set has been in use and comparing the actual reliability of the new question set after it has been in use to a calculated predicted reliability to find the coefficient; based on:

constructing a set of probable question set answers, and, with the set of probable question set answers, calculating a measure for predicted reliability of the new question set, assuming the new question set to have a same distribution of characteristics as a known set of the questions having known reliability; and correcting the predicted reliability of the new question set, relative to the actual reliability of the new question set after the new question set has been in use, wherein the empirical data are used to discriminate the questions and produce an exam question set with higher quality than a randomly selected set.

9. The method according to claim 8, wherein the data set comprises information regarding quality of the corresponding answers to each question, and wherein the quality of the corresponding answers is related to whether generally good candidates of the test candidates providing an answer answered the question correctly.

10. The method according to claim 9, wherein the information regarding quality of the corresponding answers comprises a deviation in said quality relative to a complete exam question set of which each answer was a part.

11. The method according to claim 8, wherein the prior use information comprises a ratio of correct answers to each question.

12. The method according to claim 8, wherein the evaluation means is further adapted to discard selected questions not fulfilling the predetermined requirements, said predetermined requirements comprising:

a correlation between quality of the answers given to the questions and the quality of an exam question set in which the answer is provided, a deviation in the quality of the answers given to the questions being above a predetermined value, so as to ensure that the selected questions are suitable for distinguishing between test candidates of different skill levels.

13. The method according to claim 8, wherein the method uses a Kuder-Richardson measure (KR 20) or a Cronbach's Alpha measure to measure overall test-quality of a question set comprising previously used questions in the database.

14. The method according to claim 8, wherein the method uses a Spearman-Brown prediction formula to measure predicted reliability of the new question set according to:

$$\rho_{xx'}^p = \frac{N\rho_{xx'}}{1 + (N-1)\rho_{xx'}}$$

where N is a multiple of the number of items in a known good subset of the new set, found by $$N = \frac{N_T}{N_R}$$

(where $N_T$ is the number of items in the new question set, while $N_R$ is the number of items in the subset) and $\rho_{xx'}$ is reliability of the subset.

15. A test generation method for improving computer-generated exams by generating exam question sets suited to separating test candidates of different skill levels, the method comprising:

storing a number of questions in a plurality of topics on a computer database, wherein each question is associated with a data set of prior use information related to answers given to the question in previous tests presented to test candidates and updating the database to reflect empirical data collected from previous exams to find selectivity, facility and reliability of question and question sets presented to test candidates, wherein the empirical data for each question on the computer generated exams is collected to find the selectivity, reliability and facility of the questions and the database is updated to reflect the collected empirical data, said database further comprising unused questions including newly added questions;

randomly selecting, with a computer system, questions within at least one of the topics from the database; and evaluating, with the computer system, the selected questions for inclusion in a new question set relative to predetermined requirements applied to the prior use information on the selected questions and their corresponding answers in the data set;

wherein selected questions not fulfilling the predetermined requirements are discarded from the new question set and selected questions that do not fit a chosen profile regarding selectivity and facility are discarded, such that a controlled distribution of difficulty is obtained;

wherein the evaluation means is adapted to discard selected questions not fulfilling the predetermined requirements by fitting a number of correct answers per failure in the selected questions with a predetermined distribution, so as to ensure the controlled distribution of difficulty in the new question set; and wherein the evaluation means is further adapted to find a coefficient indicating a quality of questions in the database, the database including the questions associated with prior use information and the unused questions including newly added questions, by calculating an actual reliability of the new question set and comparing the actual reliability of the new question set after it has been in use to a calculated predicted reliability to find the coefficient, based on constructing a set of probable question answers, and, with the set of probable question set answers, calculating a measure for predicted reliability of the new question set, assuming the new question set to have a same distribution of characteristics as a known set of the questions having known reliability; and correcting the predicted reliability of the new question set, relative to the actual reliability of the new question set after the new question set has been in use, wherein the empirical data are used to discriminate the questions and produce an exam question set with higher quality than a randomly selected set.

16. The method of claim 15, wherein the data set of prior use information comprises information regarding quality of the corresponding answers given to each question, and wherein the quality of the corresponding answers is related to whether generally good candidates of the test candidates providing an answer answered the question correctly.

17. The method of claim 15, wherein the prior use information comprises a ratio of correct answers to each question.

18. The method of claim 15, further comprising using a Kuder-Richardson or Cronbach's Alpha measure to measure an overall test-quality of previously used questions in the database.

19. The method of claim 15, further comprising using a Spearman-Brown prediction formula to predict reliability of the new question set according to:

$$\rho_{xx'}^p = \frac{N\rho_{xx'}}{1+(N-1)\rho_{xx'}},$$

in which N is a multiple of the number of items in a known good subset of the new question set, found by:

$$N = \frac{N_T}{N_R}$$

(in which $N_T$ is the number of items in the new question set, while $N_R$ is the number of items in the subset), and $\rho_{xx'}$ is a reliability of the subset.

20. The method of claim 15, wherein the database contains information about who contributed the questions, and wherein an overall quality of questions from a workgroup is estimated based on origin.

* * * * *